United States Patent [19]

Lopez et al.

[11] Patent Number: 5,655,967

[45] Date of Patent: Aug. 12, 1997

[54] TORSION DAMPER, AND A FRICTION UNIT CONSTITUTING A SUB-ASSEMBLY FOR SUCH A TORSION DAMPER

[75] Inventors: Carlos Lopez; Luis Gomez; Manuel Mariscal, all of Madrid, Spain

[73] Assignee: Valeo, Paris, Cedex, France

[21] Appl. No.: 251,303

[22] Filed: May 31, 1994

[30] Foreign Application Priority Data

Jun. 2, 1993 [FR] France ............... 93 06584

[51] Int. Cl.[6] ............................................. F16D 3/14
[52] U.S. Cl. .................................................... 464/68
[58] Field of Search ........................... 464/68, 64, 66; 192/106.2, 106.1, 70.17, 212, 214, 214.1

[56] References Cited

U.S. PATENT DOCUMENTS

| | | | |
|---|---|---|---|
| 4,378,869 | 4/1983 | Friedman | 192/106.2 |
| 4,574,932 | 3/1986 | Despres | 192/106.2 |
| 5,014,842 | 5/1991 | Graton et al. | 464/68 X |
| 5,205,389 | 4/1993 | Raab et al. | 464/68 X |
| 5,251,736 | 10/1993 | Jeppe et al. | 464/68 X |

FOREIGN PATENT DOCUMENTS

| | | |
|---|---|---|
| 2446960 | 8/1980 | France . |
| 2524097 | 9/1983 | France . |

*Primary Examiner*—Daniel P. Stodola
*Assistant Examiner*—Eileen A. Dunn
*Attorney, Agent, or Firm*—Longacre & White

[57] ABSTRACT

A torsion damper, especially for a motor vehicle clutch, is of the kind which includes a friction cassette, i.e. a unitary sub-assembly comprising a friction assembly, which includes a guide ring, a spacing ring having at its outer periphery at least one axially oriented projection, at least one drive ring interposed axially between the guide ring and the spacing ring. A spring causes the drive ring to be gripped between the guide ring and the spacing ring, and this spring bears on a closing ring which is arranged on the side of the guide ring opposite to the spacing ring, and the closing ring is connected to the axial projection of the spacing ring.

8 Claims, 4 Drawing Sheets

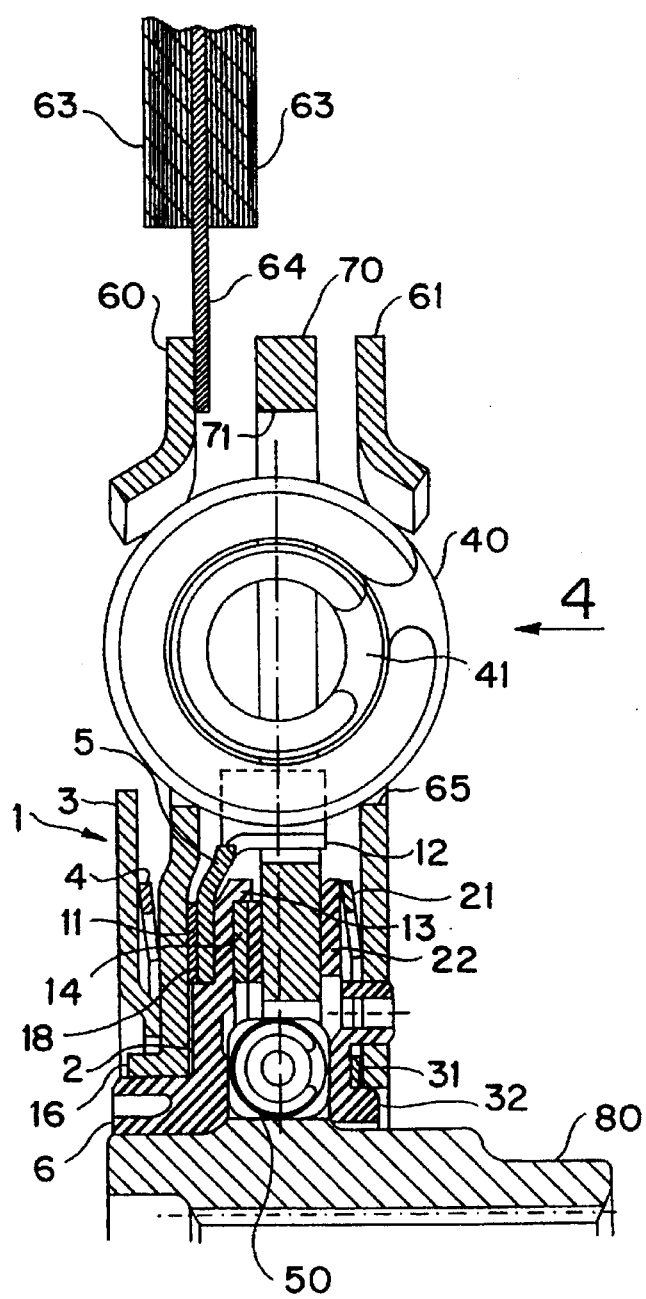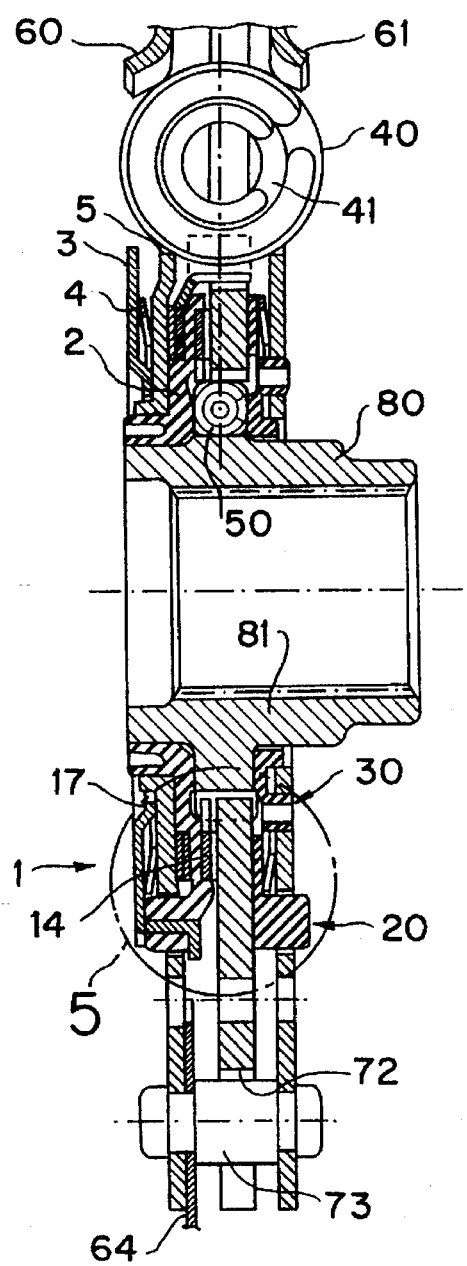

TORSION DAMPER, AND A FRICTION UNIT CONSTITUTING A SUB-ASSEMBLY FOR SUCH A TORSION DAMPER

FIELD OF THE INVENTION

The present invention relates to torsion dampers, especially for motor vehicle clutches, of the kind which include a friction means made in the form of a sub-assembly or friction unit which is assembled to other components of the torsion damper during manufacture; the invention also relates to such a subassembly per se.

In particular, the invention relates to a unitary friction sub-assembly for a torsion damper, comprising: a guide ring for mounting circumferentially acting resilient members thereon; a spacing ring having at its outer periphery at least one axially oriented projection extending through an associated aperture in the guide ring, coupling the spacing ring to the guide ring for rotation with the latter; at least one drive ring interposed axially between the guide ring and the spacing ring, for meshing, with a clearance, with a hub plate of the torsion damper; and axially acting resilient gripping means for gripping the drive ring between the spacing ring and the guide ring, with the said resilient gripping means engaging, firstly, on the guide ring on the side opposite to the spacing ring, and secondly on a reaction abutment.

BACKGROUND OF THE INVENTION

A sub-assembly of the above kind is described in the specification of U.S. Pat. No. 4,574,932 and the corresponding French published patent application FR 2 524 097A. Such a sub-assembly is commonly referred to as a "friction cassette".

In the above mentioned United States patent specification, snap-fitting means are arranged between the resilient gripping means and the spacing ring. To this end, the spacing ring has resiliently deformable lugs which, in practice, are separate elements from the axial projections of the spacing ring. As a result, the resilient gripping means are exposed to the outside, in such a way that they can become damaged under various circumstances, and in particular when being transported.

In addition, the spacing ring is quite complicated, because it has, firstly, axial projections, and secondly, resiliently deformable lugs. In addition, the holes that have to be formed in the guide ring to accommodate the resilient lugs and projections tend to weaken that ring.

DISCUSSION OF THE INVENTION

An object of the present invention is to overcome the above mentioned drawbacks by providing, in a simple and inexpensive manner, a novel type of friction cassette in which the resilient gripping means are protected from damage.

According to the invention, a unitary friction subassembly for a torsion damper, comprising: a guide ring for mounting circumferentially acting resilient members thereon; a spacing ring having at its outer periphery at least one axially oriented projection extending through an associated aperture in the guide ring, coupling the spacing ring to the guide ring for rotation with the latter; at least one drive ring interposed axially between the guide ring and the spacing ring, for meshing, with a clearance, with a hub plate of the torsion damper; and axially acting resilient gripping means for gripping the drive ring between the spacing ring and the guide ring, with the said resilient gripping means engaging, firstly, on the guide ring on the side opposite to the spacing ring, and secondly on a reaction abutment, is characterised in that the axially acting resilient gripping means bear on a closing ring which is arranged on the side of the guide ring opposite to the spacing ring, and in that the said closing ring is connected to the axial projection of the spacing ring.

Thus, advantage is taken of the closing ring to enable the axially acting resilient gripping means to be protected by the closing ring, which masks these latter.

Preferably, the said axial projection has an internal opening through it; and the closing ring is assembled to the said projection by means of its internal opening. This arrangement has the advantage that a standard guide ring can still be used. For example, the closing ring can be attached on the said projection by screw fastening, by ultrasonic welding, by riveting, or otherwise.

Preferably, the closing ring is of metal and includes an axially oriented lug which extends through the internal opening of the said axial projection, and which is turned back radially after having passed through the said opening. In this way, the closing ring is firmly attached to the spacing ring, and covers the internal opening in the axial projection so that the latter is stiffened. With this arrangement, the number of components is reduced to a minimum, and the torsion damper as a whole is reduced in cost.

It will be appreciated that in all cases, the guide ring is stiffened because it has no more than one type of opening, namely at least one opening through which the said axial projection can pass. In addition, the spacing ring is simplified because it has no resiliently deformable lugs. This spacing ring is easy to make by moulding, with the internal opening in the axial projection being itself easy to make.

A preferred embodiment of the invention will be described below, by way of example only and with reference to the accompanying drawings.

BRIEF DESCRIPTION OF THE DRAWINGS

FIG. 1 is a view in axial cross section showing part of a torsion damper for a motor vehicle, having a unitary friction sub-assembly in accordance with the invention.

FIG. 2 is a view on a larger scale of the upper part of FIG. 1.

DESCRIPTION OF A PREFERRED EMBODIMENT OF THE INVENTION

Figure 3:
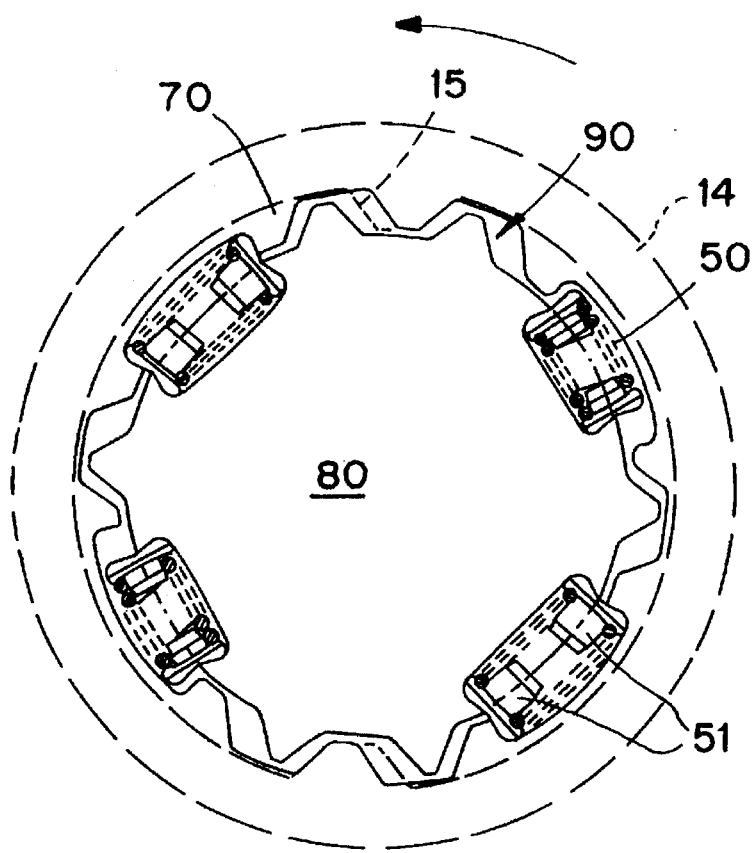
FIG. 3 is a diagrammatic view on a larger scale, showing the loose coupling means which are arranged between the hub plate and the hub of the damper shown in FIG. 1.

The drawings show a torsion damper for a motor vehicle clutch. This torsion damper comprises, in the usual known way, and as described for example in the specification of U.S. Pat. No. 4,574,932, two coaxial parts which are mounted for movement with respect to each other against the action of circumferentially acting resilient means 40 and 41 and axially acting friction means 1, 20, 30. The first coaxial part consists generally of the elements indicated at 60, 61 and 64, while the second coaxial part consists generally of the elements 70 and 80, all of which will be explained below.

More precisely, the first coaxial part comprises, in this example, two guide rings 60 and 61, one of which is fixed to a clutch disc 64, also forming part of the first coaxial part, with friction liners 63 being secured to the disc 64 on either side of the latter. In this example the guide rings 60 and 61 are of metal. They are arranged on either side of a hub plate 70, and are joined together by means of spacer members 73 which for this purpose extend, with a clearance, through an aperture 72 formed in the hub plate 70. The spacer members 73 also secure the metallic disc 64 to the guide ring 60.

The axially acting resilient means comprise a subassembly consisting of a friction unit 1, of the kind comprising the guide ring 60, which is arranged for the resilient members 40 and 41 to be fitted to it, a spacer ring 2 having at its outer periphery at least one axially oriented projection 7, and at least one drive ring 5. The projection 7 (or each of these projections) passes through an associated hole 10 formed in the guide ring 60, so as to couple the spacing ring 2 with the guide ring 60 for rotation with it. The drive ring 5 is interposed axially between the guide ring 60 and the spacing ring 2, and has means for loose meshing engagement with the hub plate 70.

Axially acting resilient gripping means 4 bear on the guide ring 60 on the opposite side from the spacing ring 2, so as to grip the drive ring 5 between the guide ring 60 and the spacing ring 2. These resilient means 4 also bear on a reaction abutment of a closing ring 3 which is joined to the spacing ring 2.

Figure 5:
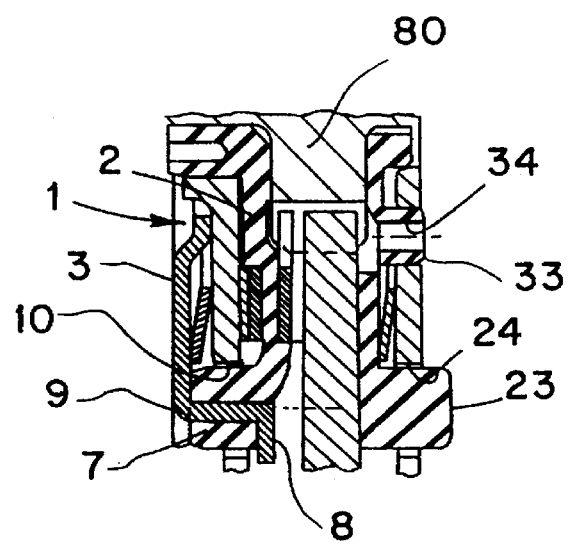
FIG. 5 is a scrap view, on a larger scale, of the portion of FIG. 1 which is ringed at V.

As can be seen in FIGS. 1, 2 and 5, the spacing ring 2 is interposed axially between the hub plate 70 and the guide ring 60. The spacing ring 2 acts as a guide for resilient members 50 of low stiffness, which are interposed radially between the inner periphery of the hub plate 70 and the outer periphery of a hub 80.

In this example, and as is best seen in FIG. 3, loose meshing, or loose coupling means 90 (which are loose in the sense that they define a clearance which is taken up before meshing coupling takes place) are arranged between the hub plate 70 and the hub 80. The loose coupling means 90 comprise teeth which alternate circumferentially with slots, the said teeth and slots being formed respectively on the inner periphery of the hub plate 70 and the outer periphery of a hub flange 81. This flange 81 projects radially from the outer periphery of the hub 80. As can be seen best in FIG. 3, the teeth of the hub flange 81 penetrate, with a clearance, into the slots formed on the inner periphery of the hub plate 70, and vice versa. In this example, the teeth are of trapezoidal shape. The succession of teeth is interrupted by a succession of recesses in which the resilient members 50 are fitted. In this example, these resilient members are in the form of coil springs, which are of relatively low stiffness as mentioned above. The circumferential ends of these springs bear on thrust insert cups 51, dorsal faces of which are of dihedral shape.

The other circumferentially acting resilient members, i.e. those acting between the guide ring 60, 61 and the hub plate 70, consist in this example of a plurality of pairs of concentric coil springs 40 and 41. These are mounted in windows 65 and 71 which are formed in facing relationship with each other in the guide rings 60, 61, and in the hub plate 70, respectively. In a modification, not shown, a single spring may be substituted for each pair of springs mounted in the windows 65 and 71. In a further modification not shown, blocks of a suitable plastic material may be substituted for the coil springs 40 and 41.

In the usual known way, some of the springs 40 and 41 are mounted without clearance in the windows 65 and 71, while others (see FIG. 4) are mounted without a clearance in the windows 65 of the guide rings 60 and 61, but with a clearance in the windows 71 of the hub plate 70. Thus the springs 40 and 41 work in a differential manner. They are stiffer than the springs 50.

Figure 4:
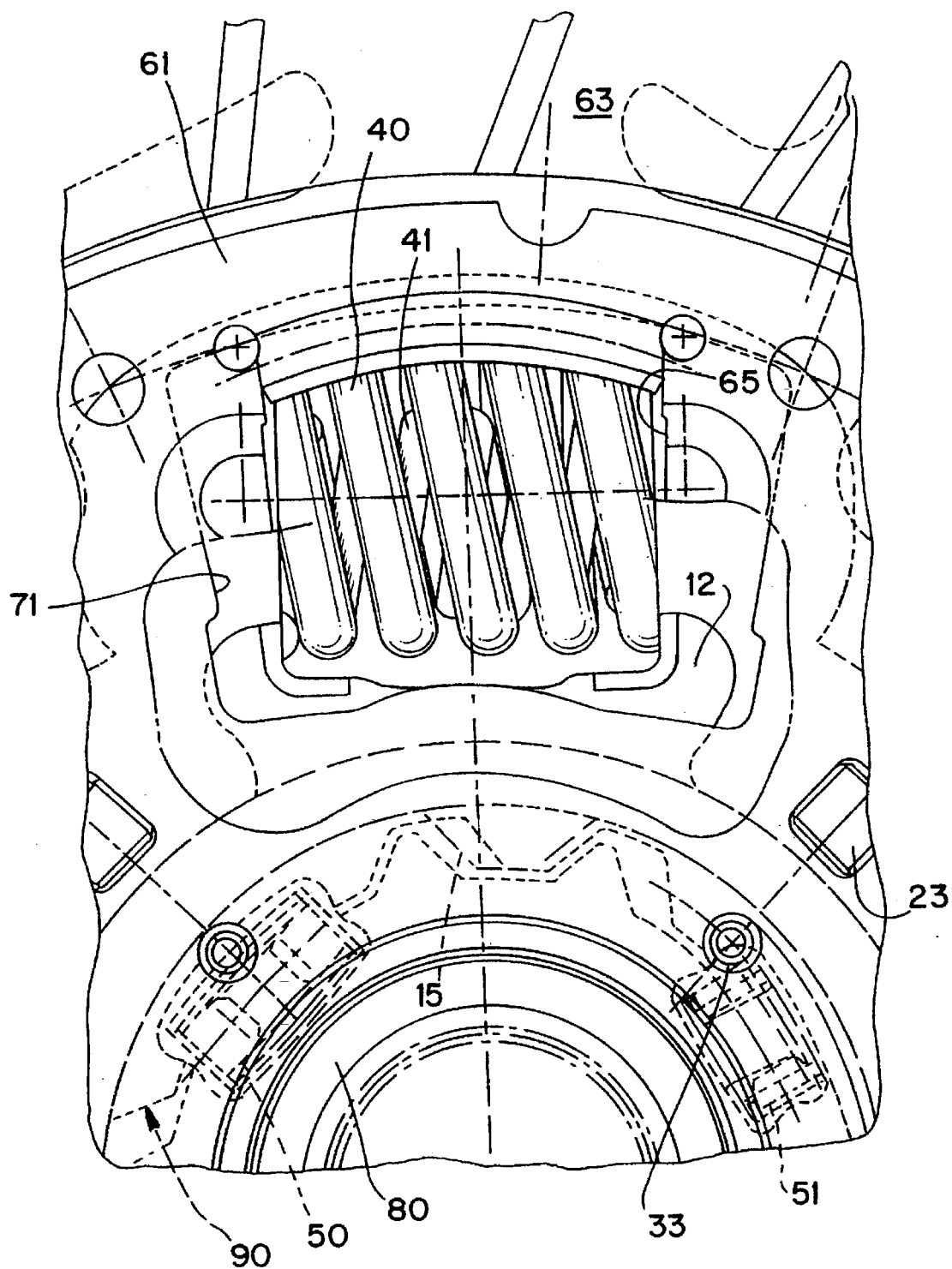
FIG. 4 is a partial view seen in the direction of the arrow 4 in FIG. 2.

The springs 50 are also guided by a bearing 32 having an L-shaped cross section and interposed axially between the hub plate 70 and the guide ring 61. An axially acting resilient means 31, which in this example is a Belleville ring, bears on the guide ring 61 so as to act on the bearing 32 and to bias the latter into contact with that face of the hub flange 81 which faces towards the guide ring 61. The bearing 32 is interposed radially, with a clearance, between the inner periphery of the guide ring 61 and the hub 80. The bearing 32 has an integral, central sleeve portion and a plurality of spigots 33, each of which passes through a hole 34 which is formed through the guide ring 61, so as to couple the bearing 32 with the guide ring 61 for rotation together with it. Each of these spigots 33 is cylindrical in shape with a central hole, as is best seen in FIG. 4.

As will have been understood from the foregoing, the components 31 and 32 are part of the friction means 30 which is interposed axially between the guide rings 60, 61 and the hub plate 70.

A further, and similar, friction means 20 is arranged radially outwardly of the friction means 30. The friction means 20 comprise a friction ring 22 in contact with the hub plate 70 and having at its outer periphery a set of axial projections 23, which in this example are of square cross section as can be seen in FIG. 4. Each of these projections 23 extends through a hole 24 which is formed in the guide ring 61. Thus the ring 22 is coupled to the guide ring 61 for rotation with it.

An axially acting resilient means 21, which in this example is another Belleville ring, bears on the guide ring 61 so as to act on the friction ring 22. The Belleville ring 21 causes the spacing ring 2 to be gripped in a manner to be described below.

More precisely, given that the spacing ring 2 is part of the unitary sub-assembly 1 (which will also be referred to here for convenience as a friction cassette), this cassette is characterized in that the axially acting resilient gripping means 4 bear on a closing ring 3 which is arranged on that side of the guide ring 60 which is opposed to the spacing ring 2, and the said closing ring 3 is connected to the axial projection 7 of the spacing ring 2. The closing ring 3 is in one piece with the reaction abutment.

In the present example, the projection 7 is open internally from one side to the other, so that this internal opening defines a central through passage. The closing ring 3, which is here of metal, comprises an axially oriented lug 9 which extends through this internal opening in the projection 7. The free end of the lug 9, having passed through this opening, is bent in a radial direction, in the present case in a direction away from the axis of the assembly, so as to form a transverse shoulder 8. In this way, the closing ring 3 is attached to the spacing ring 2, and presents the shoulder 8 on the opposite side of the guide ring 60.

In this example, the projections 7 have a contour which is identical to that of the axial noses 23 of the friction ring 22, so that their cross section is square. The same is true for the holes 10 and 24, which in the present example are identical with each other for reasons of standardisation.

The projections 7 and noses 23 cooperate in a complementary way with the lateral edges of the holes 10 and 24 respectively, with a slight fitting clearance being provided between the circumferential edges of the projections 7 and noses 23 and the corresponding holes 10 and 24 respectively. Thus these projections 7 and noses 23 are located on the guide rings 60 and 61 respectively for rotation with them. In a complementary manner, the lug 9 extends through the internal through opening, which in this example is formed centrally, in the nose 7. The cross sectional shape of this opening is rectangular here, and the cross section of the lug 9 is correspondingly rectangular.

As will have been understood from the foregoing, this arrangement enables standard guide rings to be used, because the holes 10 and 24 are identical with each other; and the arrangement is furthermore extremely simple, because it is merely sufficient to provide a through passage in the projections of the spacing ring 2. In addition, the number of components is minimised.

Furthermore, the friction cassette is easy to make. It is made as follows. In a first step, the Belleville ring constituting the resilient gripping means 4 is fitted between the guide ring 60 and the closing ring 3, with the lug 9 being passed through the internal through opening in the projection 7, the drive ring 5 having previously been interposed between the spacing ring 2 and the guide ring 60. After this, all that has to be done is to bend the free end of the lug 9 radially outwards so as to form the shoulder 8 and to complete the cassette or sub-assembly 1.

It is important to note that the closing ring 3 has at its inner periphery an engagement portion 90 which is offset axially with respect to the main portion of the closing ring 3, towards the guide ring 60, so as to make contact with this latter. In this way the spring 4 is well protected by the ring 3 by which it is masked, and is under no danger of being damaged during the process of bending back the end of the lug 9.

It will be appreciated that the spring 4 is confined between the closing ring 3 and the guide ring 60, which together define a cage. In addition, the projections 7 also enable the resilient ring 4 to be centred.

In this example, the drive ring 5 is secured to a friction ring 11 which is interposed between the drive ring 5 and the guide ring 60. The drive ring 5 and friction ring 11 may be secured together, for example adhesively. Thus the drive ring 5, which in this example is of metal, is arranged to make frictional contact directly against the spacing ring 2 and indirectly against the guide ring 60 (via the friction ring 11). It is of course possible to reverse these arrangements, with the friction ring 11 then being fixed to the guide ring 60 so that the drive ring 5 can make direct frictional contact against the guide ring 60. The choice of which of these two arrangements to adopt depends on the particular application. Similar considerations apply to the number of axial projections 7, 23, 33 and the number of springs 40, 41, 50.

In this connection, in the present example there are four projections 23, 7, 33, and these are in circumferential alternation with the pairs of springs 40 and 41, with the projections 33 being aligned radially with the projections 23 as can be seen in FIG. 4.

The drive ring 5 has at its outer periphery at least two axial lugs 12, turned axially at right angles (see FIG. 4), each of which is arranged to make contact with one of the circumferential ends of a corresponding one of the springs 40 mounted with a clearance in the window 71, that is to say a spring acting differentially.

The drive ring 5 thus has at least one fork which is associated with one of the differential springs 40. The other springs 40, which are mounted without a clearance in the windows 71 of the hub plate, are not concerned in this arrangement. Since in this example there are four pairs of springs 40, 41, the number of these forks is in this example two, namely two forks which are diametrically opposed to each other for balancing reasons. However, it will be understood that the number of these forks does depend on the particular application.

The axial lugs 12 thus extend through the hub plate 70, via the windows 71 in the latter. In this example the spacing ring 2 and the friction ring 22, together with the bearing 32, are preferably made of a suitable synthetic material, such as a plastics material, having a low coefficient of friction, while the closing ring 3 and the drive ring 5 are of metal as mentioned above. The components 2, 22 and 32 are preferably reinforced with fibres, such as glass fibre, so as to improve their rigidity.

A further metallic ring 14, shown in FIG. 3, is interposed between the hub plate 70 and the spacing ring 2. This ring 14 has a friction liner secured to one of its faces, and is provided with teeth 15 which mesh, with a clearance, with the teeth of the hub flange 81. In practice, this ring 14 acts as a pulling element and makes contact with the teeth of the hub 80 before the teeth of the hub plate 70 engage those of the hub.

In the present example the spacing ring 2 also defines a bearing and, to this end, it is provided at its inner periphery with an axially oriented spigot 6, which is interposed radially between the outer periphery of the hub 80 and the inner periphery of the guide ring 60. Preferably, for this purpose, the latter is formed with a flange 16 oriented axially. The flange 16 is of annular form and is endless, so as to surround the spigot 6, with which it is in frictional cooperation.

The spacing ring 2 makes contact with the hub flange 81 and also with the bearing 32. The spacing ring 2 also has a centering surface 18 for centering the drive ring 5, together with an axially oriented annular flange 13 at its outer periphery. This flange 13 is directed away from the guide ring 60 and towards the hub plate 70. The flange 13 also surrounds the friction ring 14, as can be seen in FIG. 2, so as to provide centering for the ring 14 by cooperating with the outer periphery of the latter. The centering surface 18 cooperates with the inner periphery of the metallic drive ring 5. This centering surface 18 is formed on a recess which is itself formed in the spacing ring 2; accordingly the thickness of the latter is reduced at its outer periphery.

It will be noted that the flange 13 also stiffens the spacing ring 2, and that a slight clearance exists between the transverse portion of the latter and the guide ring 60, as can be seen in FIG. 2.

The torsion damper couples the friction liners 63 to the hub 80. The liners 63 are arranged to be gripped between the pressure plate and the reaction plate (not shown) of the clutch, while the hub 80 is internally splined so as to couple it with the input shaft of the gearbox.

The torsion damper operates as follows. In a first step, only the springs 50 are compressed, with the guide rings 60 and 61 being in fixed relationship to the hub plate 70 through the stiffer springs 40 and 41. In this first step, the friction means 30 are also in operation, with relative motion occurring between the bearing 32 and the hub flange 81, and also between the spacing ring 2 and the hub 80 with its flange 81. This friction is ensured by the Belleville ring 31.

In a second step, after the clearance between the teeth of the hub 80 and the teeth 15 of the ring 14 has been taken up, the ring 14 comes into operation, so that it provides an additional amount of friction by virtue of the ring 14 frictionally engaging against the hub plate 70 and spacing ring 2. This second step, is continued until the clearance between the teeth of the hub 80 and the teeth of the hub plate 70 has been taken up.

During a third step, the springs 50 remain in their compressed state, and the hub plate 70 becomes fixed with respect to the hub 80 for rotation with it. The main springs 40 and 41, i.e. those which are mounted without clearance in their windows 65 and 70, then come into play, and become compressed. The friction means 20 then give rise to an additional friction effect, which is given by the Belleville ring 21 whereby the rings 14, 2, 5 and 11 are gripped between the hub plate 70 and the guide ring 60. This friction supplied by the Belleville ring 21 applies a greater load than that provided by the Belleville ring 31.

In a fourth step, those springs 40 and 41 that are mounted with a clearance in the windows 71 (see FIG. 4) are caused to operate after the above mentioned clearance has been taken up. The drive ring 5 is then in engagement, through its lugs 12, with the hub plate 70, the lugs 12 being in engagement with the appropriate side edges of the windows 71.

The drive ring 5 is now displaced with respect to the spacing ring 2 and guide ring 60, so that an additional friction effect occurs, ensured by the Belleville ring 4. The drive ring 5 is then in meshing engagement, but with a clearance, with the hub plate 70, so that it is caused to operate in a differential way.

As will have been understood, and as will appear from the above description, it is possible to make the friction sub-assembly, at one manufacturing location, in such a way that it cannot be lost and is easy to handle and to transport. It can then be assembled to the other components of the torsion damper in a second manufacturing location. In this way, machine downtime is reduced to a minimum.

The present invention is of course not limited to the particular embodiment described above and shown in the drawings. In particular, the axially acting resilient rings 4, 31, 21 may consist of corrugated resilient rings instead of Belleville rings.

In addition, the provision of the springs 50 is not mandatory: in this connection, the hub plate 70 may be secured to the hub 80, being for example seamed on to the hub flange 81. In that case, only one friction means 30 is provided.

Figure 6:
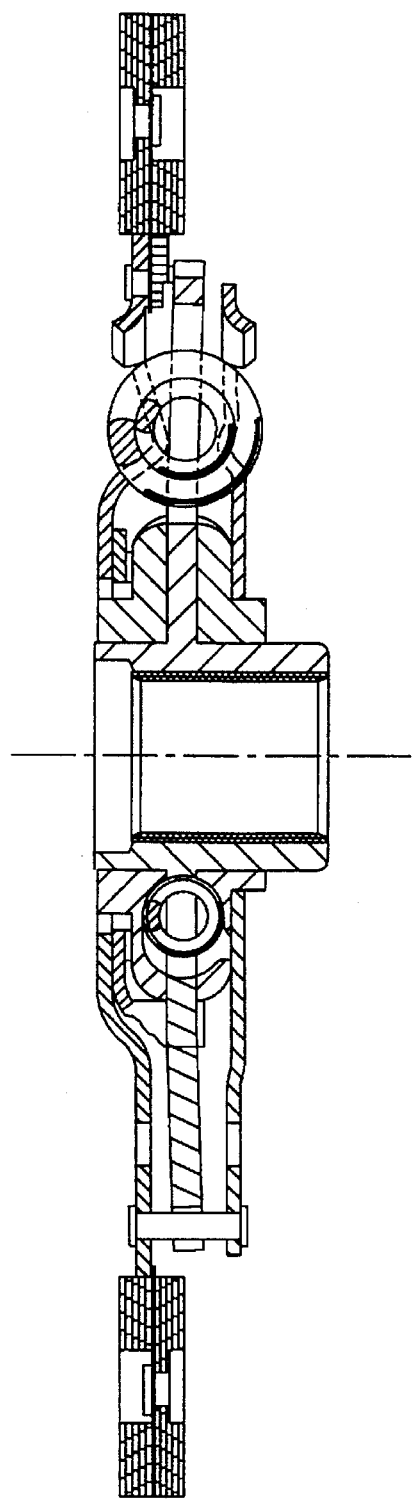
FIG. 6 is a view in axial cross section showing a prior art torsion damper.

In a modification, the unitary friction sub-assembly (friction cassette) may be part of a torsion damper of the kind illustrated in FIG. 6. For example, and if reference is made to FIG. 6, it will be seen that the spacing ring may also serve to guide the low stiffness springs of the torsion damper, which in this case has a hub plate integral with the hub. The spacing ring then also meshes with at least one spring 40, and with the bearing 32, which is made in the image of the spacing ring 2. It will be noted that here, all of the springs 40 and 41 are mounted with a clearance in the windows of the hub plate.

Still with reference to FIG. 6, it will be seen that the arrangement according to the present invention enables the guide ring of the friction cassette to be simplified. In this connection, due to the present invention, the distance between the hub plate and the guide ring is reduced to a minimum, so that the axial deformation which it is necessary to effect at the inner periphery of that guide ring in order to accommodate the various friction rings is reduced to a minimum. This can be seen best in FIG. 2 of the drawings accompanying the present specification.

The engagement of the gripping means 4 on the guide ring 60 can of course be obtained indirectly through an interposed additional ring.

In all cases, the invention enables the drive ring 5 to operate differentially. This drive ring 5 can of course have at its outer periphery two radial arms defining a fork which makes engagement with the spring 40, together with an axially oriented lug for loose meshing (meshing with a clearance) with the hub plate 70. The additional ring 14 (FIGS. 1 and 3) is not essential, since the spacing ring 2 can be arranged to engage frictionally directly against the hub plate 70.

It will be appreciated that the location of the spring element 4 on the outside of the guide ring 60 enables additional functions to be obtained, in particular due to the presence of the ring 14; and that the axial size of the torsion damper is not unduly increased, because the closing ring 3 extends radially inwardly of the springs 40, 41 and is contained axially within the overall contour defined by the springs 40. Thus, the space that already exists at the inner periphery of the guide ring 60 is made use of.

Although in all the accompanying drawings, the clutch disc 64 is arranged to be driven in rotation through its friction liners 63 by the reaction plate mounted on the crankshaft of the engine of the vehicle (for rotation with the crankshaft), the hub 80 being coupled in rotation to the input shaft of the gearbox, the clutch disc 60 may be without any friction liners, and may be secured directly to the reaction plate.

What is claimed is:

1. A torsion damper comprising a hub plate, a sub-assembly constituting a friction unit, and circumferentially acting resilient members coupling the said sub-assembly to the hub plate, said sub-assembly comprising: a guide ring defining means for mounting said circumferentially acting resilient members; a spacing ring having an outer periphery with at least one axially oriented projection at said outer periphery, the guide ring having at least one aperture receiving said axial projection of the spacing ring, whereby to couple the spacing ring with the guide ring for rotation together; at least one drive ring interposed axially between the guide ring and the spacing ring and defining loose coupling means for meshing, with a clearance, of the drive ring with said hub plate; a reaction abutment formed as part of the closing ring adjacent to the guide ring, with the guide ring being disposed intermediate between the reaction abutment and the spacing ring; and axially acting resilient gripping means disposed between the reaction abutment and the guide ring, on the side of the guide ring remote from the spacing ring, whereby to engage the guide ring so as to cause the drive ring to be gripped between the spacing ring and the guide ring wherein said sub-assembly includes a closing ring which is disposed at the side of the guide ring remote from the spacing ring and masks the axially acting resilient gripping means, said closing ring being connected to said axial projection of the spacing ring, and wherein said at least one axially oriented projection defines an internal through opening thereof, the closing ring being made of metal and including an axially oriented lug extending through said internal through opening, a free end of said lug being bent in a radial direction on the side of said opening opposite to the remainder of the closing ring.

2. A torsion damper according to claim 1, wherein the closing ring has at an inner periphery an engagement portion for engagement with the said guide ring.

3. A torsion damper according to claim 1, wherein the spacing ring has a centering spigot at an inner periphery thereof, the guide ring having an axially oriented flange surrounding said spigot.

4. A torsion damper according to claim 1, wherein the spacing ring defines a centering surface for centring the drive ring.

5. A torsion damper according to claim 4, wherein the spacing ring is formed with a recess in which the said centering surface is defined, whereby the spacing ring is of reduced thickness at an outer periphery.

6. A torsion damper according to claim 4, wherein the spacing ring has at an outer periphery an axially oriented lug directed away from the guide ring.

7. A torsion damper according to claim 4, wherein the closing ring has at its inner periphery an engagement portion which is offset axially with respect to the main portion of the closing ring, toward the guide ring, so as to enable contact with the guide ring.

8. A torsion damper comprising a hub plate, a sub-assembly constituting a friction unit, and circumferentially acting resilient members coupling the said sub-assembly to the hub plate, said sub-assembly comprising: a guide ring defining means for mounting said circumferentially acting resilient members; a spacing ring having an outer periphery with at least one axially oriented projection at said outer periphery, the guide ring having at least one aperture receiving said axial projection of the spacing ring, whereby to couple the spacing ring with the guide ring for rotation together; at least one drive ring interposed axially between the guide ring and the spacing ring and defining loose coupling means for meshing, with a clearance, of the drive ring with said hub plate; a reaction abutment formed as part of the closing ring adjacent to the guide ring, with the guide ring being disposed intermediate between the reaction abutment and the spacing ring; and axially acting resilient gripping means disposed between the reaction abutment and the guide ring, on the side of the guide ring remote from the spacing ring, whereby to engage the guide ring so as to cause the drive ring to be gripped between the spacing ring and the guide ring wherein said sub-assembly includes a closing ring which is disposed at the side of the guide ring remote from the spacing ring and masks the axially acting resilient gripping means, said closing ring being connected to said axial projection of the spacing ring, wherein said axially acting resilient gripping means is confined between the closing ring and the guide ring to thereby define a cage.

* * * * *